United States Patent
Inada

(10) Patent No.: US 10,089,151 B2
(45) Date of Patent: Oct. 2, 2018

(54) APPARATUS, METHOD, AND PROGRAM MEDIUM FOR PARALLEL-PROCESSING PARAMETER DETERMINATION

(71) Applicant: FUJITSU LIMITED, Kawasaki-shi, Kanagawa (JP)

(72) Inventor: Yoshie Inada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/876,252

(22) Filed: Jan. 22, 2018

(65) Prior Publication Data

US 2018/0210762 A1    Jul. 26, 2018

(30) Foreign Application Priority Data

Jan. 25, 2017    (JP) ................................ 2017-010880

(51) Int. Cl.
*G06F 9/46*    (2006.01)
*G06F 9/50*    (2006.01)

(52) U.S. Cl.
CPC .......... *G06F 9/5066* (2013.01); *G06F 9/5027* (2013.01); *G06F 2209/501* (2013.01)

(58) Field of Classification Search
CPC .................................................. G06F 9/5066
See application file for complete search history.

(56) References Cited

U.S. PATENT DOCUMENTS

| | | | |
|---|---|---|---|
| 2009/0222390 A1* | 9/2009 | Yuta .................. | G06F 17/30412 706/13 |
| 2010/0161624 A1* | 6/2010 | Inada .................. | G06F 17/5009 707/754 |
| 2012/0266178 A1 | 10/2012 | Tajima | |
| 2015/0169383 A1* | 6/2015 | van den Berghe ... | G06F 9/5094 718/104 |

FOREIGN PATENT DOCUMENTS

| | | |
|---|---|---|
| JP | 6-149866 | 5/1994 |
| JP | 2003-050987 | 2/2003 |
| JP | 2003-058518 | 2/2003 |

* cited by examiner

*Primary Examiner* — Sisley Kim
(74) *Attorney, Agent, or Firm* — Fujitsu Patent Center

(57) ABSTRACT

A method for determining parallel-processing parameters including: randomly generating first sample points each having a coordinate value representing the number of nodes to be used for running a first program and the number of processes per node to be executed in the running of the first program, calculating evaluation values of the respective first sample points based on information collected in the running, calculating a first statistics from the evaluation values; repeating the generating of the first sample points until the first statistic becomes equal to or smaller than a first threshold; and determining, based on a result of interpolation of the evaluation values of the first and the second sample points, the number of nodes and the number of processes that are recommended for running the first program.

9 Claims, 8 Drawing Sheets

FIG. 5

| ID | THE NUMBER OF NODES | THE NUMBER OF PROCESSES | THE NUMBER OF THREADS | PROCESSING TIME | ARITHMETIC OPERATION EFFICIENCY | EVALUATION VALUE |
|---|---|---|---|---|---|---|
| 1 | $x_1$ | $y_1$ | $z_1$ | $t(1)$ | efficiency(1) | $f(1)$ |
| 2 | $x_2$ | $x_2$ | $z_2$ | $t(2)$ | efficiency(2) | $f(2)$ |
| ... | ... | ... | ... | ... | ... | ... |

113

APPARATUS, METHOD, AND PROGRAM MEDIUM FOR PARALLEL-PROCESSING PARAMETER DETERMINATION

CROSS-REFERENCE TO RELATED APPLICATION

This application is based upon and claims the benefit of priority of the prior Japanese Patent Application No. 2017-10880, filed on Jan. 25, 2017, the entire contents of which are incorporated herein by reference.

FIELD

The embodiments discussed herein are related to a parallel-processing parameter determination program, a parallel-processing parameter determination method, and a parallel-processing management apparatus.

BACKGROUND

Highly advanced computing is performed in high-performance computing (HPC) by using a large number of computing nodes, and each computing node has a large number of processor cores. When an application program (hereinafter, simply referred to as an app) is run in such HPC, the number of computing nodes (the number of nodes) to be used in a job for running the app and the number of processes to be generated are designated as running conditions.

Appropriate running conditions are determined by considering various factors such as processing speed and power consumption. For example, if processing speed is high, but if excessive power is consumed, the running conditions are not appropriate. That is, running conditions leading to values balanced in a plurality of indexes for determination are appropriate.

Obtaining appropriate running conditions is one of optimization issues. Various solution methods are conceived for the optimization issues related to computer systems. For example, a solution searching device able to search for an optimum solution efficiently and reliably in fields of optimum designing, system identification, image reconfiguration, and optimum control is disclosed. In addition, a technology related to a method for efficiently performing apparatus adjustment considered to be optimum for a user in an optimization adjustment method using a genetic algorism is disclosed. Further, a network system that implements fair services with guaranteed performance in a system that provides processing services such as high-calculation-load web services is disclosed. The examples of the related art are Japanese Laid-open Patent Publication Nos. 06-149866, 2003-050987, and 2003-058518.

The degree of running time reduction achieved by increasing the degree of parallel processing in app running depends on the app, and appropriate running conditions thus depend on the app. To obtain appropriate running conditions (combination of values of designated items such as the number of nodes, the number of processes, and the number of threads) for a specific app, the app is actually run. In this case, if the app is run by using all of usable nodes and under all of conceivable running conditions and if processing times and processing efficiencies are compared, it is possible to find appropriate running conditions leading to higher performance of the app. However, since an increase of the number of nodes and mainstreaming of multicores in recent years has led to an increase of combinations of values of the items designated as running conditions, it is difficult to run the app in a large scale system under all of the running conditions. Note that such an issue arises in not only apps but also any program capable of parallel processing.

In one aspect, an object of the present disclosure is to efficiently calculate an appropriate running condition for a program.

SUMMARY

According to an aspect of the invention, a method for determining parallel-processing parameters including: randomly generating first sample points each having a coordinate value representing the number of nodes to be used for running a first program and the number of processes per node to be executed in the running of the first program, calculating evaluation values of the respective first sample points based on information collected in the running, calculating a first statistics from the evaluation values; repeating the generating of the first sample points until the first statistic becomes equal to or smaller than a first threshold; and determining, based on a result of interpolation of the evaluation values of the first and the second sample points, the number of nodes and the number of processes that are recommended for running the first program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table illustrating example sample information;

DESCRIPTION OF EMBODIMENTS

Hereinafter, embodiments will be described with reference to the drawings. Any of the embodiments may be combined with each other as long as the combination is consistent.

First Embodiment

First, a parallel-processing management apparatus according to a first embodiment will be described. The parallel-processing management apparatus is an apparatus that implements a parallel-processing parameter determination method for determining appropriate parameters to be used for parallel processing in a program.

Figure 1:
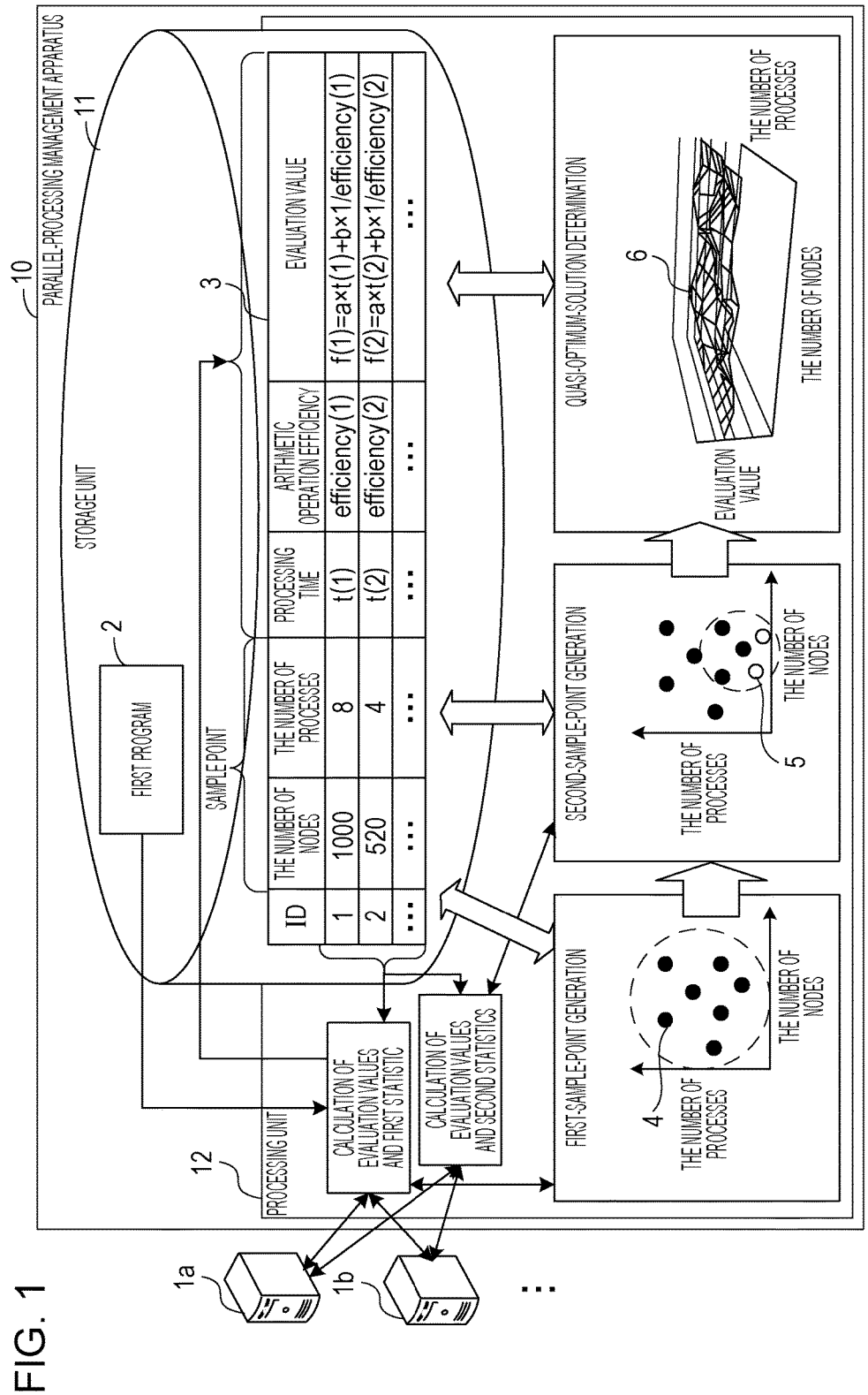
FIG. 1 is a diagram illustrating an example configuration of a parallel-processing management apparatus according to a first embodiment.

FIG. 1 is a diagram illustrating an example configuration of the parallel-processing management apparatus according to the first embodiment. A parallel-processing management apparatus 10 manages jobs to be executed by a plurality of computing nodes including computing nodes 1a, 1b, . . . . The jobs to be executed include running a first program 2 in parallel. The parallel-processing management apparatus 10 may determine appropriate parameters to be used when the first program 2 is run. The parameters include the number of nodes to be used for running the first program 2 and the number of processes per node to be executed when the first program 2 is run. Note that the parameters may also include the number of threads per process to be used when the first program 2 is run.

The parallel-processing management apparatus 10 includes a storage unit 11 and a processing unit 12. The storage unit 11 stores therein the first program 2 and sample information 3. The storage unit 11 is, for example, a memory or a storage device of the parallel-processing management apparatus 10.

The first program 2 is a program to be analyzed for appropriate parameters. The sample information 3 is information regarding sample points each having a coordinate value representing the number of nodes used for running the first program 2 and the number of processes per node executed when the first program 2 is run. For example, the sample information 3 has the number of nodes, the number of processes, a processing time, an arithmetic operation efficiency, and an evaluation value that are set for each ID of a corresponding one of the sample points. The sample information 3 may also include the power consumption of each sample point. The processing time, the arithmetic operation efficiency, and the power consumption of each sample point are pieces of information collected by running the first program 2 in accordance with the number of nodes and the number of processes that are represented by the sample point.

The evaluation value is a numeric value indicating whether the first program 2 has been appropriately run in accordance with the number of nodes and the number of processes represented by the sample point from the viewpoints of processing speed, low power consumption, and effective use of resources. The evaluation value is calculated in accordance with an evaluation expression using, as variables, two of a processing time, an arithmetic operation efficiency, and power consumption, for example. Weightings may be applied to the respective variables used in the evaluation expression.

The processing unit 12 performs processing for determining the appropriate parameters. For example, the processing unit 12 is a processor of the parallel-processing management apparatus 10. The processing unit 12 may determine the appropriate parameters, for example, by running a parallel-processing parameter determination program. The processing unit 12 performs the following processing.

First, the processing unit 12 randomly generates a plurality of first sample points 4 each having a coordinate value representing the number of nodes to be used for running the first program 2 and the number of processes per node to be executed when the first program 2 is run. Here, the number of the first sample points should be a statistically meaningful number, depending on the maximum available number of the nodes and the maximum available number of processes per node in the system. The processing unit 12 then causes the computing nodes to run the first program 2 for each first sample point 4 in accordance with the number of nodes and the number of processes represented by the first sample point 4. This enables the processing unit 12 to acquire information such as a processing time, an arithmetic operation efficiency, and power consumption that are observed when the first program 2 is run in accordance with the first sample point 4.

The processing unit 12 calculates the evaluation value of the first sample point 4 based on the information acquired when the first program 2 is run. For example, the processing unit 12 calculates the evaluation value in accordance with a predetermined evaluation expression using weightings respectively applied to the processing time and the arithmetic operation efficiency.

The processing unit 12 also calculates a first statistic based on variations (degrees of changes) of a plurality of first sample pairs each obtained by selecting two first sample points 4 from the plurality of first sample points 4. Each variation is an absolute value of a value obtained in such a manner that, for example, an evaluation value difference between the two first sample points 4 in a first sample pair is divided by a distance between the first sample points 4. The processing unit 12 sets, as the first statistic, for example, the average of the variations of the respective first sample pairs.

The processing unit 12 repeats generating the first sample points 4 randomly, calculating the evaluation values, and calculating the first statistic until the first statistic becomes equal to or smaller than a first threshold.

The processing unit 12 also generates second sample points 5 each having a coordinate value representing the number of nodes to be used for running the first program 2 and the number of processes per node to be executed when the first program 2 is run. Each second sample point 5 is generated within a predetermined distance from one of the first sample points 4. For example, from among the first sample points 4 and/or the second sample points 5 that are located within a predetermined distance from a focused first sample point 4, the processing unit 12 identifies one of the first sample points 4 or the second sample points 5 that has the largest evaluation value difference from the focused first sample point 4. The processing unit 12 generates a new second sample point 5 at a midpoint between the focused first sample point 4 and the first sample point 4 or the second sample point 5 thus identified.

The processing unit 12 then causes the computing nodes to run the first program 2 for each second sample point 5 in accordance with the number of nodes and the number of processes represented by the second sample point 5. This enables the processing unit 12 to acquire information such as a processing time, an arithmetic operation efficiency, and power consumption that are observed when the first program 2 is run in accordance with the second sample point 5.

The processing unit 12 calculates the evaluation value of the second sample point 5 based on the information acquired when the first program 2 is run. The processing unit 12 also calculates, for each of the first sample points 4 that serves as a target first sample point 4, an evaluation value variation between the target first sample point 4 and each different first sample point 4 within the predetermined distance from the target first sample point 4 and an evaluation value variation between the target first sample point 4 and the second sample point 5 within the predetermined distance, each evaluation value variation being based on a corresponding one of a distance between the target first sample point 4 and the different first sample point 4 and a distance between the target first sample point 4 and the second sample point. The processing unit 12 calculates a second statistic based on each variation relative to a corresponding one of the different first sample point 4 and the second sample points 5. The second statistic has a value that is increased as the evaluation value variation is increased. For example, the processing unit 12 divides an evaluation value difference between the target first sample point 4 and a different first sample point 4 by a distance between the target first sample point 4 and the different first sample point 4 and divides an evaluation value difference between the target first sample point 4 and a second sample point 5 by a distance from the target first sample point 4 and the second sample point 5, the different first sample point 4 and the second sample point 5 being located within the predetermined distance from the target first sample point 4. The processing unit 12 sets the absolute values of the division results as the variations of the different first sample point 4 and the second sample point 5 with respect to the target first sample point 4. The processing unit 12 sets, as the second statistic of the target first sample point 4, the average of the variations of the different first sample points 4 and the second sample points 5 within the predetermined distance from the target first sample point 4.

The processing unit 12 repeats generating a second sample point 5 within the predetermined distance from one of the first sample points 4 that has a second statistic larger than a second threshold and calculating the evaluation value and the second statistic of the first sample point 4 until the second statistic of each first sample point 4 becomes equal to or smaller than the second threshold.

The processing unit 12 then performs interpolation processing on the evaluation values of the first sample points 4 and the second sample points 5 and determines, based on the interpolation result, the number of nodes and the number of processes (a quasi-optimum solution) recommended for running the first program 2. For example, the processing unit 12 generates an evaluation-value curved-surface 6 having the evaluation values of the first sample points 4 and the second sample points 5 as the result of the interpolation processing. The processing unit 12 determines, as the number of nodes and the number of processes recommended for running the first program 2, the number of nodes and the number of processes that are located to represent the largest value or the smallest value of the evaluation values on the evaluation-value curved-surface 6.

The parallel-processing management apparatus 10 as described above repeats adding a first sample point 4 until the first statistic becomes equal to or smaller than the first threshold. A small number of first sample points 4 is likely to cause a large number of evaluation values of the first sample points 4 to serve as the maximum value or the minimum value. This case leads to a large variation of a first sample pair and thus a large first statistic. It is expected that in such a situation, there are also a large number of other combinations of the number of nodes and the number of processes having the evaluation values serving as the maximum value or the minimum value.

If the number of first sample points 4 is increased, the percentage of the first sample points 4 having the evaluation values serving as the maximum value or the minimum value is decreased. This increases the number of the first sample pairs having a small variation and lowers the first statistic. If a first sample point 4 is not added after the first statistic becomes equal to or smaller than the first threshold, adding an unnecessary first sample point 4 and running the first program 2 in accordance with the first sample point 4 are restrained, and thus processing is made efficient.

The parallel-processing management apparatus 10 further adds a second sample point 5 around the target first sample point 4 until the second statistic becomes equal to or smaller than the second threshold. Accordingly, if a point (the number of processes and the number of nodes) having a better evaluation value than that of the first sample point 4 is present around the first sample point 4, such a point may be found. The accuracy of the evaluation-value curved-surface 6 is thereby enhanced, and the appropriate quasi-optimum solution may be determined. In other words, the appropriate program running conditions may be efficiently determined.

Second Embodiment

A second embodiment will be described. The second embodiment uses, as parameters indicating program running conditions, the number of nodes, the number of processes, and the number of threads. The computer obtains a quasi-optimum solution of the number of nodes, the number of processes, and the number of threads.

Figure 2:
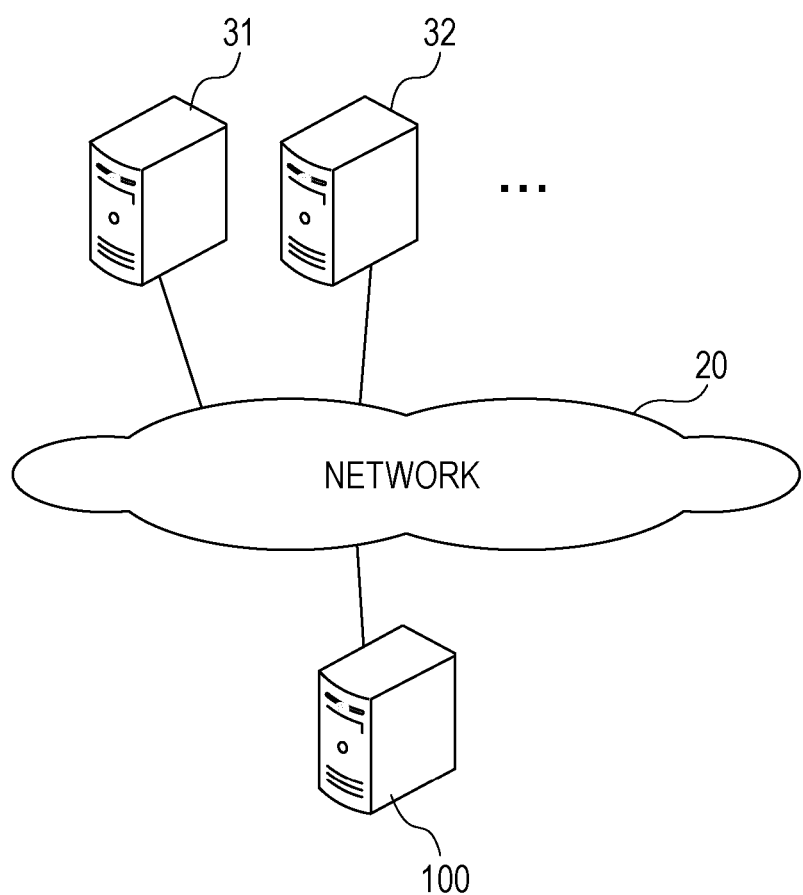
FIG. 2 is a diagram illustrating an example configuration of a system according to a second embodiment.

FIG. 2 is a diagram illustrating an example configuration of a system of the second embodiment. A plurality of computing nodes 31, 32, . . . are connected to a management node 100 via a network 20. The plurality of computing nodes 31, 32, . . . are each a computer that runs an app. The system in the second embodiment is a large-scale system, and thus the number of the computing nodes 31, 32, . . . is, for example, approximately one million.

The management node 100 instructs the plurality of computing nodes 31, 32, . . . to run the app. The management node 100 may use the plurality of computing nodes 31, 32, . . . to calculate appropriate values of the number of computing nodes to be used, the number of processes, and the number of threads for running the app.

Figure 3:
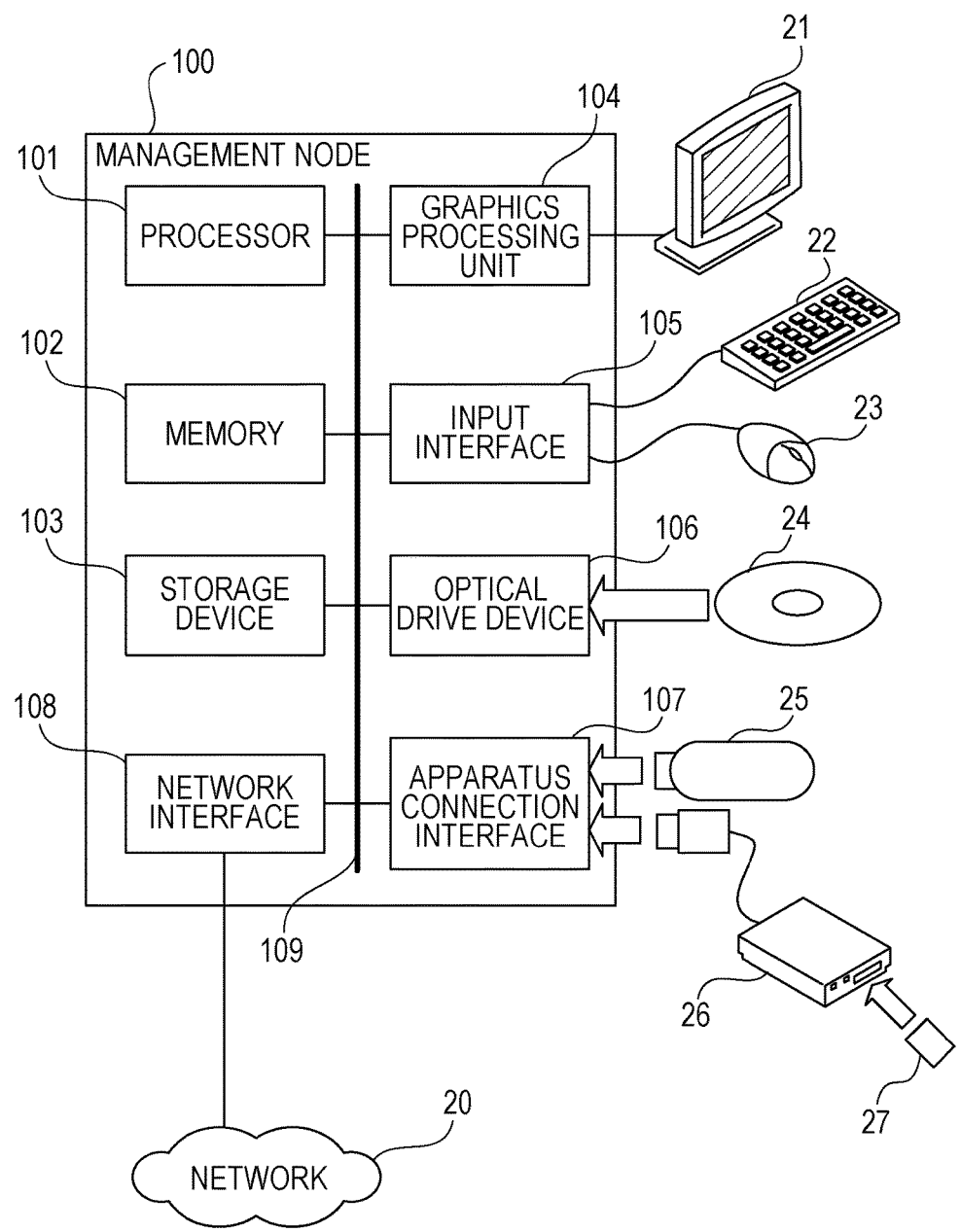
FIG. 3 is a diagram illustrating an example hardware configuration of a management node.

FIG. 3 is a diagram illustrating an example hardware configuration of a management node. A processor 101 performs overall control of the management node 100. A memory 102 and a plurality of peripheral devices are connected to the processor 101 via a bus 109. The processor 101 may be a multiprocessor. The processor 101 is, for example, a central processing unit (CPU), a micro processing unit (MPU), or a digital signal processor (DSP). At least one of functions implemented in such a manner that the processor 101 runs a program may be implemented by an electronic circuit such as an application specific integrated circuit (ASIC) or a programmable logic device (PLD).

The memory 102 is used as a main memory of the management node 100. The memory 102 temporarily stores therein the operating system (OS) program to be run by the processor 101 and at least one of application programs. The memory 102 stores therein various pieces of data desired for processing to be performed by the processor 101. A volatile semiconductor memory such as a random access memory (RAM) is used as the memory 102.

The peripheral devices connected to the bus 109 include a storage device 103, a graphics processing unit 104, an input interface 105, an optical drive device 106, an apparatus connection interface 107, and a network interface 108.

The storage device 103 electrically or magnetically writes and reads data to and from a recording medium included in the storage device 103. The storage device 103 is used as the auxiliary memory of the computer. The storage device 103 stores therein the OS program, the application programs, and various pieces of data. Note that, for example, a hard disk drive (HDD) or a solid state drive (SSD) may be used as the storage device 103.

A monitor 21 is connected to the graphics processing unit 104. The graphics processing unit 104 displays an image on the screen of the monitor 21 in accordance with an instruction from the processor 101. A display device using a cathode ray tube (CRT) or a liquid crystal display device is used as the monitor 21.

A keyboard 22 and a mouse 23 are connected to the input interface 105. The input interface 105 transmits, to the processor 101, a signal received from the keyboard 22 or the mouse 23. Note that the mouse 23 is an example of a pointing device, and a different pointing device is also usable. Examples of the different pointing device include a touch panel, a tablet, a touch pad, and a trackball.

The optical drive device 106 reads data recorded in an optical disc 24 by using laser light or the like. The optical disc 24 is a portable recording medium having data recorded therein to be readable by light reflection. A digital versatile disc (DVD), a DVD-RAM, a compact disc read only memory (CD-ROM), a CD-recordable (R)/rewritable (RW), or the like is used as the optical disc 24.

The apparatus connection interface 107 is a communication interface for connecting the peripheral devices to the management node 100. For example, a memory device 25 and a memory reader-writer 26 may be connected to the apparatus connection interface 107. The memory device 25 is a recording medium having a function of communicating with the apparatus connection interface 107. The memory reader-writer 26 is a device that writes and reads data to and from a memory card 27. The memory card 27 is a card recording medium.

The network interface 108 is connected to the network 20. The network interface 108 transmits and receives data to and from another computer or a communication apparatus via the network 20.

The hardware configuration as described above enables processing functions according to the second embodiment to be implemented. Note that the apparatus illustrated in the first embodiment may also be implemented with the same hardware as that of the management node 100 illustrated in FIG. 3.

The management node 100 implements the processing functions according to the second embodiment, for example, by running programs recorded in a computer-readable recording medium. Program describing details of processing to be performed by the management node 100 may be recorded in various recording media. For example, programs to be run by the management node 100 may be stored in the storage device 103. The processor 101 loads at least one of the programs in the storage device 103 on the memory 102 and runs the program. The programs to be run by the management node 100 may also be recorded in a portable recording medium such as the optical disc 24, the memory device 25, or the memory card 27. The program stored in the portable recording medium may be run under the control of, for example, the processor 101 after being installed in the storage device 103 or may be run after the processor 101 directly reads out the program from the portable recording medium.

Difficulty with calculation of appropriate values of the number of computing nodes to be used, the number of processes, and the number of threads will be described in detail.

The management node 100 may run an app on two or more computing nodes 31, 32, . . . in parallel after instructing the computing nodes 31, 32, . . . to run the app. A larger number of computing nodes (a larger number of nodes) used for running the app enables the app to be run in a shorter time, whereas a larger number of nodes leads to more power consumption per unit time. In addition, a larger number of computing nodes leads to not only more communications between the computing nodes but also a wait time for data to be provided from a different computing node, and a utilization ratio per processor is thus lowered. If the utilization ratio per processor is lowered, even increasing the number of nodes does not contribute to the reduction of the app running time so much. Accordingly, from the viewpoints of effective resource use and power consumption reduction, an appropriate number of nodes varies depending on the app.

When instructing any of the computing nodes to run an app, the management node 100 may designate the number of processes to be executed by one computing node for running the app. In a case where all of the processor cores of the computing node are used, determining the number of processes to be executed by the computing node uniquely determines the number of threads. For example, suppose a case where one computing node has 32 processor cores. If 1 is designated as the number of processes, one process is generated in the computing node, and 32 threads are generated in the process. One thread per processor core is executed. If 2 is designated as the number of processes, two processes are generated, and 16 threads are generated in each process. As described above, the larger the number of processes, the smaller the number of threads per process. In addition, the larger the number of processes to be executed by one computing node, the higher the degree of independency of processes to be executed in parallel. However, there is a harmful effect such as more memory consumption. Moreover, an appropriate number of processes varies depending on the app.

As described above, it is difficult for a user to determine a combination of the number of nodes and the number of processes appropriate for running the app by themselves. Moreover, only some of the processor cores in the computing nodes are to be used in some cases. For example, if some of the processor cores are not used and thus stopped, power consumption may be reduced. If only some of the processor cores are used, the number of processes to be executed by one computing node is determined but the number of threads is not uniquely determined. In other words, an appropriate number of threads is determined with a relationship between an increase of the number of threads and the power consumption taken into consideration. The number of threads in addition to the number of nodes and the number of processes is thus to be determined for the appropriate running conditions. Accordingly, it is more difficult for the user to determine the appropriate running conditions by themselves.

In the second embodiment, the appropriate running conditions are determined by using the sizing function of the management node 100. Sizing is processing for selecting the number of nodes, the number of processes, and the number of threads that satisfy the performance requirements of an app to as high a degree as possible. The performance requirements are indexes for determining whether the performance in running the app is high or low. A short running time and a high arithmetic operation efficiency typically correspond to a high running performance. The performance requirements are expressed by using an evaluation function using a processing time and an arithmetic operation efficiency as variables.

For example, if the app is run in the sizing for all of the combinations of the number of nodes, the number of processes, and the number of threads and if the processing times and the arithmetic operation efficiencies are compared, it is possible to find a combination of the number of nodes, the number of processes, and the number of threads that satisfies the application performance requirements to the highest degree. However, a huge number of nodes in a system and a large number of processor cores in each computing node lead to an significantly large number of combinations of the number of nodes, the number of processes, and the number of threads and an significantly long time taken for the sizing. Here, consider combinations of only the number of nodes and the number of processes. If the total number of nodes in the system is 100 and if the number of processor cores in each computing nodes is 20, there are 2000 (100×20) combinations of the number of nodes and the number of processes. To find the number of nodes and the number of processes that are appropriate, the 2000 combinations are to be implemented. Adding the number of threads as a value to be selected further increases the number of combinations of optimum running conditions. Accordingly, if the number of nodes reaches one million, it is difficult to run the app for all of the combinations.

In addition, apps have been sophisticated, and a time taken for running an app one time tends to become longer. A time taken until a combination satisfying the performance requirements of the app to a high degree has thus become longer. It is thus important to efficiently find a configuration having the number of nodes, the number of processes, and the number of threads that are appropriate and to evaluate and improve the performance by using the number of nodes and the number of processes thus found.

Note that a conceivable way of making the sizing efficient is reducing a time taken for the sizing by decreasing the number of running steps of the application and thereby shortening a time per run. However, in this case, an accurate result is not likely to be obtained. Specifically, decreasing the number of running steps for the application for the sizing makes a ratio of an initialization time higher. Even if the number of nodes is increased, the length of initialization time is not changed, and thus only the running time is shortened. Accordingly, it is not possible to obtain an accurate arithmetic operation efficiency of the entire app. In addition, if the behavior of the app is changed in the course of running, the running efficiencies before and after the change of the behavior differ from each other. Accordingly, the use of only the result obtained by decreasing the number of running steps does not lead to an accurate arithmetic operation efficiency in some cases.

Another conceivable way is performing processing after combinations of the number of nodes, the number of processes, and the number of threads that are appropriate are determined by trial and error among the number of usable nodes, the number of processes, and the number of threads. In this case, the processing is performed in accordance with combinations of the number of nodes, the number of processes, and the number of threads that are located around the values of the determined number of nodes and the like, and a narrowing down operation is performed to obtain combinations having better performance. However, such a narrowing down operation is likely to lead to selection of a local optimum solution, not a truly appropriate combination, and is thus unlikely to successfully obtain a global optimum value. If as many combinations of the number of nodes, the number of processes, and the number of threads as possible are attempted to avoid selecting the local optimum solution, the running time is increased relative to the maximum number of nodes×the maximum number of processes×the maximum number of threads, and thus the attempt is overwhelmingly time consuming for a large-scale system having a large number of nodes.

Hence, it is conceivable that as highly evaluated a quasi-optimum solution as possible is obtained despite the possibility of the local optimum solution. In this case, for example, combinations of the number of nodes, the number of processes, and the number of threads are randomly selected, and the app is run. The results (evaluation values) are interpolated by using an interpolation function, and thereby a quasi-optimum combination of the number of nodes, the number of processes, and the number of threads may be obtained. Hereinafter, the combinations of the number of nodes, the number of processes, and the number of threads randomly selected are referred to as sample points.

When sample points are randomly selected, it is difficult to determine an approximate number of sample points to be selected. For example, if an insufficiently small number of randomly selected sample points leads to an accidental selection of highly biased sample points, a quasi-optimum combination is highly unlikely to be obtained. An excessive number of randomly selected sample points leads to an excessively long processing time taken for sizing.

The description above reveals that it is important to interpolate evaluation values of as few sample points as possible to obtain a quasi-optimum combination appropriately. The term "appropriately" is used to denote "avoiding assuming the shape of the function for the evaluation values to be a shape largely different from the actual shape due to an insufficient number of sample points".

To shorten a time taken for sizing and obtain an appropriate quasi-optimum solution, the management node 100 in the second embodiment first expresses a global variation by using a variation function and increases the number of the sample points until the value of the global variation function becomes equal to or smaller than a threshold designated by the user. The management node 100 also expresses a local variation by using a variation function and increases the number of sample points until the value of the local variation function becomes equal to or smaller than a threshold designated by the user. Increasing the number of sample points in this manner until each variation function becomes equal to or smaller than the corresponding threshold enables a quasi-optimum solution to be obtained based on the sample points in less biased distribution.

The global variation in the second embodiment is an example of the first statistic described in the first embodiment. The local variation in the second embodiment is an example of the second statistic described in the first embodiment.

Figure 4:
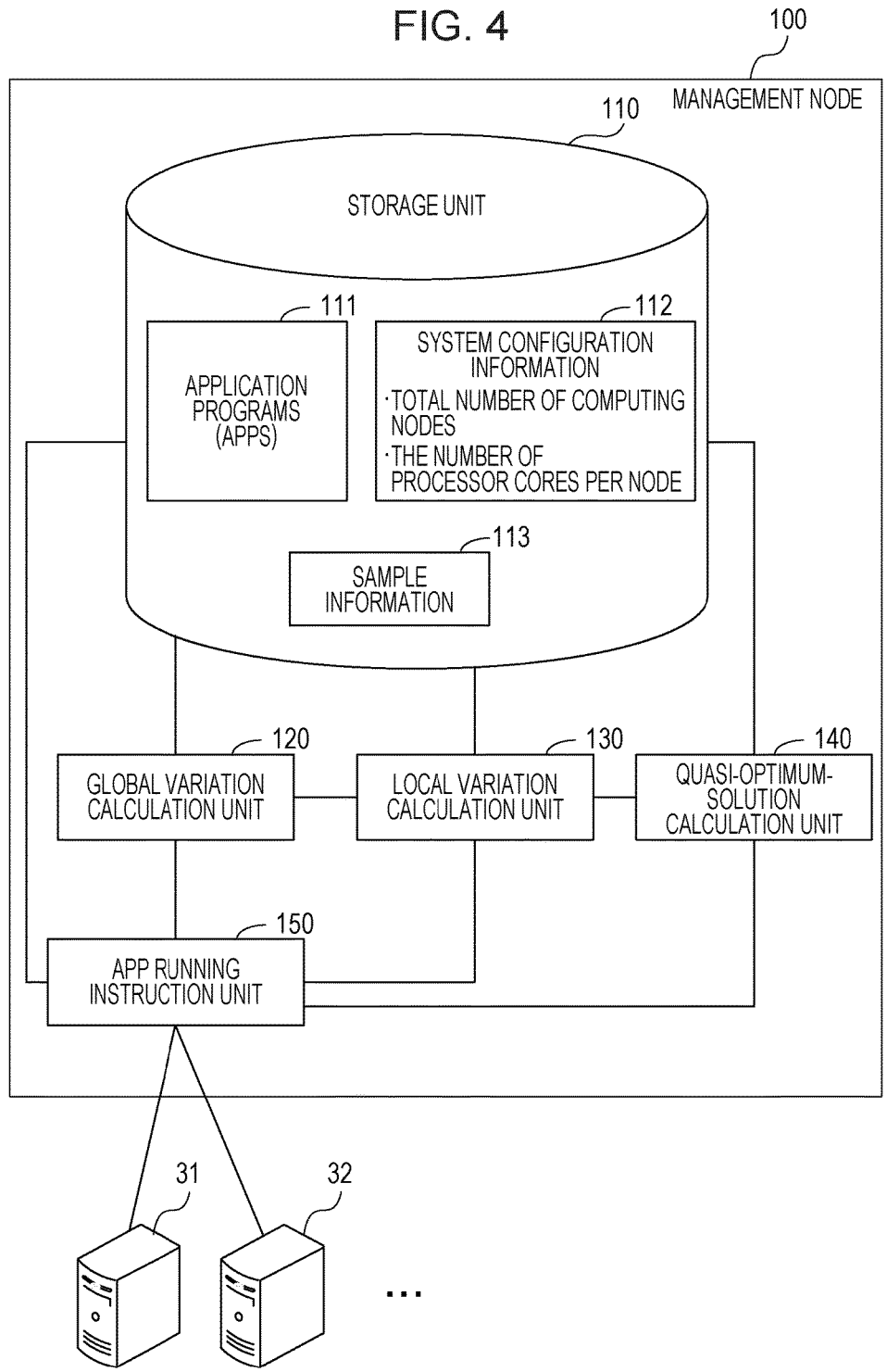
FIG. 4 is a block diagram illustrating example functions of the management node.

FIG. 4 is a block diagram illustrating example functions of the management node. The management node 100 includes a storage unit 110, a global variation calculation unit 120, a local variation calculation unit 130, a quasi-optimum-solution calculation unit 140, and an app running instruction unit 150.

The storage unit 110 includes application programs (apps) 111, system configuration information 112, and sample information 113. Each app 111 is a program for which the number of nodes, the number of processes, and the number of threads that are optimum are searched for by sizing. The system configuration information 112 is information indicating the configuration of the computing nodes 31, 32, . . . . The system configuration information 112 includes the total number of computing nodes 31, 32, . . . and the number of processor cores per node. The sample information 113 is information regarding sample points selected in the course of the sizing processing.

FIG. 5 is a table illustrating example sample information. The sample information 113 includes a plurality of records each indicating sample information regarding a corresponding one of the sample points. Each record has the number of nodes, the number of processes, the number of threads, a processing time, an arithmetic operation efficiency, and an evaluation value that are set in association with an ID uniquely identifying the corresponding sample point.

Hereinafter, the description is continued referring back to FIG. 4. The global variation calculation unit 120 calculates a global variation of the randomly set sample points. For example, when setting the sample points, the global variation calculation unit 120 requests the app running instruction unit 150 to run the app under the conditions corresponding to the sample points. The global variation calculation unit 120 acquires, from the app running instruction unit 150, processing times and arithmetic operation efficiencies as app running results. Each processing time is a time taken for running the app. Each arithmetic operation efficiency is a running efficiency of processor cores in a corresponding one of the computing nodes that runs the app. The arithmetic operation efficiency is, for example, a value obtained in such a manner that the number of instructions executed by the processor cores per unit time is divided by the maximum number of running instructions per unit time of the processor cores. For example, million instructions per second (MIPS) is used as the maximum number of running instructions per unit time.

The global variation calculation unit 120 calculates each evaluation value based on the corresponding app running result. When a sample point has an ID of i (i is an integer equal to or larger than 1), the evaluation value of the sample point is calculated in accordance with the following Formula (1):

$$f(i)=a \times t(i)+b/\text{efficiency}(i) \qquad (1).$$

In Formula (1), f(i) is the evaluation function of an i-th sample point, t(i) is a processing time taken for a combination of the number of nodes, the number of processes, and the number of threads at the i-th sample point, efficiency(i) is an arithmetic operation efficiency of the combination of the number of nodes, the number of processes, and the number of threads at the sample point i, a is a weighting to be applied to the processing time, and b is a weighting to be applied to the arithmetic operation efficiency.

Formula (1) indicates that a smaller evaluation value indicates a better performance. The weightings a and b are each a real number from 0 to 1 inclusive. Values input by the user in advance are used as the weightings a and b. The user inputs the values of a and b, for example, so as to obtain a relation "a+b=1". When putting high priority to the processing time of the app, that is, when intending a high turnaround, the user sets a small value as a. When putting high priority to the arithmetic operation efficiency, that is, throughput, the user sets a small value as b.

The global variation calculation unit 120 calculates the global variation based on the evaluation values of the sample points. The global variation calculation unit 120 repeats adding a sample point until the global variation becomes equal to or smaller than a first threshold (th1).

The local variation calculation unit 130 calculates a local variation for each sample point set by the global variation calculation unit 120. The local variation calculation unit 130 then repeats adding a sample point (corresponding to the second sample point 5 mentioned above) around any sample point having a local variation larger than a second threshold (th2) until the local variation of each sample point set by the global variation calculation unit 120 becomes equal to or smaller than the second threshold (th2). Here, a second threshold (th2) is equal to or smaller than the first threshold (th1). When adding a sample point around a specific sample point, the local variation calculation unit 130 requests the app running instruction unit 150 to run the app under the condition corresponding to the added sample point. The local variation calculation unit 130 acquires, from the app running instruction unit 150, a processing time and an arithmetic operation efficiency as app running results. The local variation calculation unit 130 recalculates the local variation of the specific sample point by using the evaluation value of the added sample point.

Hereinafter, variation calculation methods will be described in detail. The second embodiment has three variations that are a variation between two sample points, a local variation, and a global variation.

The variation between two sample points is obtained by dividing a difference between the evaluation values of the two sample points by a distance between the sample points. The variation between an i-th sample point and a j-th sample point (i and j are each an integer equal to or larger than 1 and i≠j) is expressed by using the following Formula (2).

$$|(f(i)-f(j))/\sqrt{(x_i-x_j)^2+(y_i-y_j)^2+(z_i-z_j)^2}| \qquad (2)$$

The local variation with respect to the i-th sample point is the average of variations between the i-th sample point and one of different sample points. The local variation is expressed by using the following Formula (3).

$$\Sigma_j^{N_i}|(f(i)-f(j))/\sqrt{(x_i-x_j)^2+(y_i-y_j)^2+(z_i-z_j)^2}|/N_i \qquad (3)$$

The global variation is the average of the local variations with respect to the respective sample points. The global variation is expressed by using the following Formula (4).

$$\Sigma_i^N \Sigma_j^{N_i}|(f(i)-f(j))/\sqrt{(x_i-x_j)^2+(y_i-y_j)^2+(z_i-z_j)^2}|/\Sigma_i^N N_i \qquad (4)$$

In Formulas (2) to (4), i and j are IDs of the sample points, N is an integer equal to or larger than 1 representing the number of samples, $N_i$ is the number of sample points around the i-th sample point, $x_i$ is the number of nodes of the i-th sample point, $x_j$ is the number of nodes of the j-th sample point, $y_i$ is the number of processes of the i-th sample point, $y_j$ is the number of processes of the j-th sample point, $z_i$ is the number of threads of the i-th sample point, and $z_j$ is the number of threads of the j-th sample point.

The global variation calculation unit 120 calculates the global variation by using Formula (4) among the formulas as described above. Note that in the calculation of $\Sigma_j^{N_i}$ with respect to the i-th sample point, all of sample points except the i-th sample point are used as peripheral sample points. In contrast, the local variation calculation unit 130 calculates the local variation in accordance with Formula (3) by using, as peripheral sample points, sample points other than a reference sample point that are located within a radius r from the reference sample point.

The quasi-optimum-solution calculation unit 140 generates a curved surface having all of the sample points in such a manner as to calculate a quasi-optimum solution based on the evaluation values of the set sample points. For example, the quasi-optimum-solution calculation unit 140 arranges the sample points in a four-dimensional space having an x axis representing the number of nodes, a y axis representing the number of processes, a z axis representing the number of threads, and f axis representing an evaluation value. The curved surface is, for example, a spline surface. The quasi-optimum-solution calculation unit 140 obtains, as a quasi-optimum solution, a combination of the number of nodes, the number of processes, and the number of threads, the combination being closest to the sample point having the smallest value on the z axis on the generated curved surface.

The quasi-optimum-solution calculation unit 140 outputs the calculated quasi-optimum solution as a sizing result.

The app running instruction unit 150 instructs the computing nodes 31, 32, . . . to run the app in a running environment corresponding to a sample point. For example, upon receiving a request for running one of the apps 111 in accordance with a sample point from the global variation calculation unit 120 or the local variation calculation unit 130, the app running instruction unit 150 generates a job for running the app 111. The app running instruction unit 150 then assigns computing nodes the number of which is the number of nodes represented by the sample point to the generated job. The app running instruction unit 150 then causes the assigned computing nodes to run the job for the app 111 in parallel. In this case, the app running instruction unit 150 notifies the computing nodes to execute the job of the number of processes and the number of threads represented by the sample point as the running conditions for the job. The computing nodes the number of which is the number of nodes represented by the sample point thereby run the app 111 in accordance with the number of processes and the number of threads represented by the sample point.

The app running instruction unit 150 also instructs the computing nodes to run the app 111 to record the number of running instructions per unit time. Upon completion of the running of the app 111, each computing node transmits the running result to the app running instruction unit 150. The app running instruction unit 150 sets a time from issuing the instruction for running the app 111 to receiving the running result as a processing time of the sample point based on which the job is generated to run the app 111. The app running instruction unit 150 also acquires, from each computing node having run the app 111, information regarding the number of running instructions per unit time in running the app 111. The app running instruction unit 150 sets, as an arithmetic operation efficiency of the sample point based on which the job is generated, a value obtained in such a manner that the average value of the numbers of running instructions per unit time in running the app 111 is divided by the MIPS value of the processor cores of the computing node. The app running instruction unit 150 transmits the processing time and the arithmetic operation efficiency of the sample point to the global variation calculation unit 120 or the local variation calculation unit 130 having requested to run the app 111.

The management node 100 having the configuration as described may perform sizing. For example, the user who creates the app 111 stores the app 111 in the storage unit 110 and instructs the management node 100 to perform sizing. The management node 100 then performs the sizing.

Figure 6:
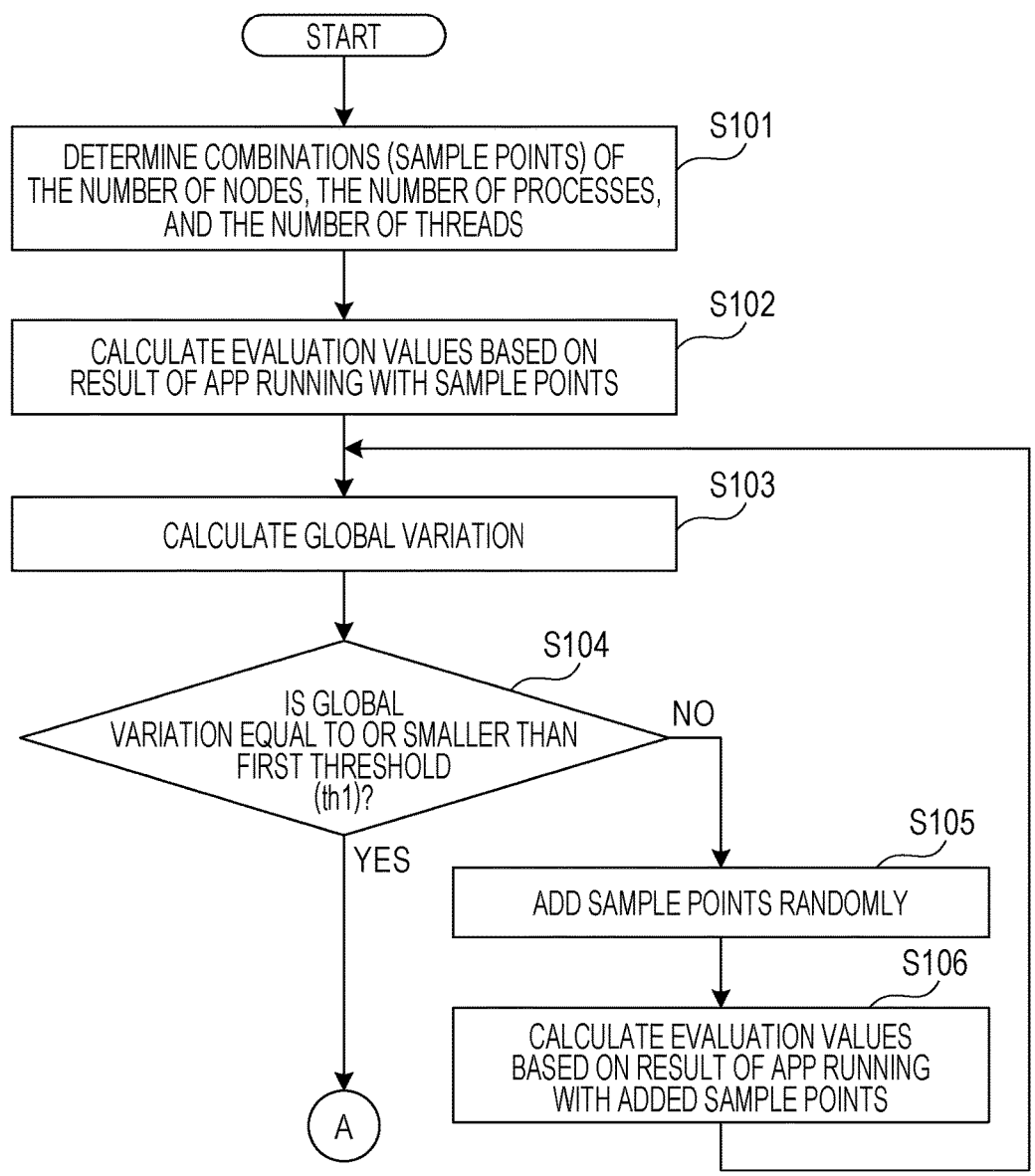
FIG. 6 is a flowchart illustrating a first half of steps of sizing processing.

Specific steps of the sizing processing will be described. FIG. 6 is a first half of a flowchart of the sizing processing. Hereinafter, the processing illustrated in FIG. 6 will be described in the order of step numbers.

In step S101, the global variation calculation unit 120 determines a predetermined number of combinations of the number of nodes, the number of processes, and the number of threads (sample points). For example, the global variation calculation unit 120 randomly determines sample points by a random-number selection technique used by the Monte Carlo method. Note that an initial number of sample points in step S101 is designated by the user in advance. In such a case that the total number of the computing nodes is one million, the user designates, for example, 10 as the initial number of sample points.

In step S102, the global variation calculation unit 120 notifies the app running instruction unit 150 of the app 111 to be run in accordance with the determined sample points and calculates the evaluation values of the sample points based on the running results. For example, the global variation calculation unit 120 instructs the app running instruction unit 150 on the running of the app to be performed in accordance with the sample points determined in step S101 and acquires a processing time and an arithmetic operation efficiency of each sample point from the app running instruction unit 150. The global variation calculation unit 120 further calculates the evaluation value of the sample point by using the processing time and the arithmetic operation efficiency in accordance with Formula (1). The global variation calculation unit 120 assigns an ID to the sample point for which the evaluation value is calculated and sets the sample information of the sample point in the sample information 113. Examples of the sample information include the number of nodes, the number of processes, the number of threads, a processing time, an arithmetic operation efficiency, and an evaluation value.

In step S103, the global variation calculation unit 120 calculates the global variation in accordance with Formula (4) by using the sample information of all of the sample points for which the evaluation values have been obtained.

In step S104, the global variation calculation unit 120 determines whether the global variation is equal to or smaller than the first threshold (th1). If the global variation is equal to or smaller than the first threshold (th1), the global variation calculation unit 120 moves the processing to step S111 (see FIG. 7). If the global variation is larger than the first threshold (th1), the global variation calculation unit 120 moves the processing to step S105.

In step S105, the global variation calculation unit 120 adds a plurality of sample points randomly. The number of sample points to be added in step S105 is designated by the user in advance. In step S105, for example, ten sample points are added.

In step S106, the global variation calculation unit 120 instructs the app running instruction unit 150 on the running of the app 111 to be performed in accordance with the added sample points and calculates the evaluation values based on the running results. Thereafter, the global variation calculation unit 120 moves the processing to step S103.

Figure 7:
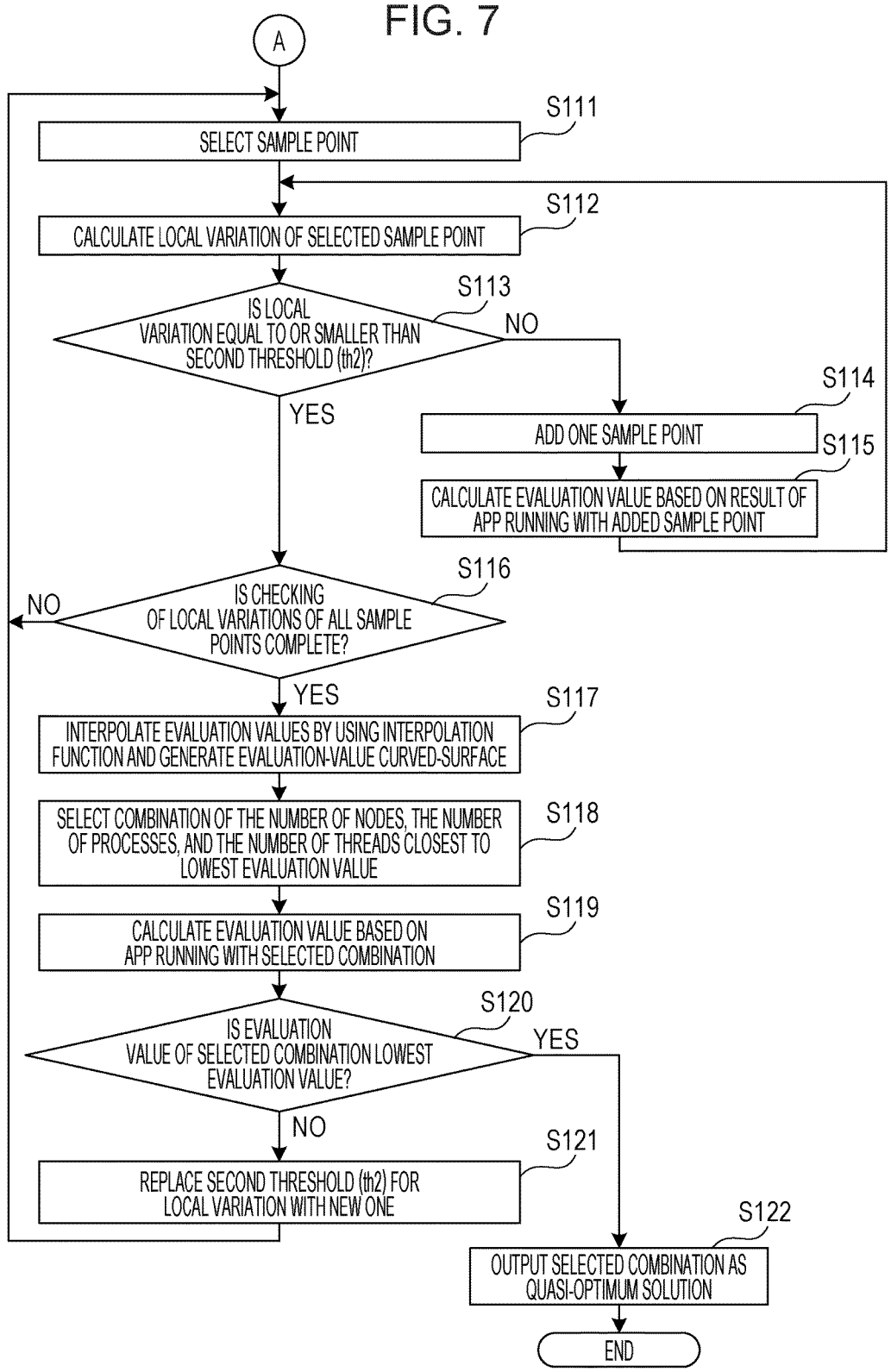
FIG. 7 is a flowchart illustrating a second half of the steps of the sizing processing.

FIG. 7 is a second half of the flowchart of the sizing processing. Hereinafter, the processing illustrated in FIG. 7 will be described in the order of step numbers.

In step S111, the local variation calculation unit 130 selects one of the sample points determined by the global variation calculation unit 120.

In step S112, the local variation calculation unit 130 calculates the local variation of the selected sample point in accordance with Formula (3). Peripheral sample points used for the local variation calculation are sample points different from the selected sample point and located within a distance r from the selected sample point.

In step S113, the local variation calculation unit 130 determines whether the local variation is equal to or smaller than the second threshold (th2). If the local variation is equal to or smaller than the second threshold (th2), the local variation calculation unit 130 moves the processing to step S116. If the local variation is larger than the second threshold (th2), the local variation calculation unit 130 moves the processing to step S114.

In step S114, the local variation calculation unit 130 adds one sample point around the selected sample point. For example, the local variation calculation unit 130 identifies one of the different sample points that are located within the distance r from the selected sample point, the identified sample point having the largest variation (value obtained by Formula (2)) with respect to the selected sample point. The local variation calculation unit 130 adds a new sample point at the midpoint between the identified sample point and the selected sample point. The number of nodes of the new sample point is the average value of the numbers of nodes of the identified sample point and the selected sample point. The number of processes of the new sample point is the average value of the numbers of processes of the identified sample point and the selected sample point. The number of threads of the new sample point is the average value of the numbers of threads of the identified sample point and the selected sample point.

When the new sample point is added at the midpoint between the selected point and the sample point having the largest variation as described above, the new sample point is thereby added in a direction representing a large variation of the evaluation value among the sample points around the selected sample point. The evaluation value of the new sample point added in the direction representing a large variation of the evaluation value has a large difference from the evaluation values of the peripheral sample points and thus is likely to be the maximum value or the minimum value. Adding a new sample point in such a location enables a sample point having an evaluation value that is the maximum value or the minimum value to be detected efficiently.

If the evaluation value of the added sample point is not the maximum value or the minimum value, the variation between the selected sample point and the added sample point is lowered. As the result, the local variation is lowered. If the local variation is lowered to be equal to or smaller than the second threshold (th2), it is predicted that a sample point having an evaluation value serving as the maximum value or the minimum value is no longer present around the selected sample point.

In step S115, the local variation calculation unit 130 instructs the app running instruction unit 150 on the running of the app 111 to be performed in accordance with the added sample point and calculates an evaluation value based on the running result. Thereafter, the local variation calculation unit 130 moves the processing to step S112.

In step S116, the local variation calculation unit 130 determines whether checking of the local variations of all of the sample points determined by the global variation calculation unit 120 is complete. If the checking of all of the sample points is complete, the local variation calculation unit 130 moves the processing to step S117. If there is an unchecked sample point, the local variation calculation unit 130 moves the processing to step S111.

In step S117, the quasi-optimum-solution calculation unit 140 interpolates the evaluation values of the sample points by using the interpolation function and generates an evaluation-value curved-surface.

In step S118, the quasi-optimum-solution calculation unit 140 selects a combination of the number of nodes, the number of processes, and the number of threads on the evaluation-value curved-surface, the combination being closest to the smallest evaluation value.

In step S119, the quasi-optimum-solution calculation unit 140 instructs the app running instruction unit 150 on the running of the app 111 to be performed in accordance with the number of nodes, the number of processes, and the number of threads that are selected and calculates an evaluation value based on the running result.

In step S120, the quasi-optimum-solution calculation unit 140 determines whether the evaluation value of the selected combination of the number of nodes, the number of processes, and the number of threads is the smallest value resulting from comparisons of the already calculated evaluation values of the sample points. If the evaluation value is the smallest value, the quasi-optimum-solution calculation unit 140 moves the processing to step S122. If a sample point having an evaluation value smaller (more highly evaluated) than the evaluation value calculated in step S119 is present, the quasi-optimum-solution calculation unit 140 moves the processing to step S121.

In step S121, the quasi-optimum-solution calculation unit 140 replaces the second threshold (th2) for the local variation with new one. For example, the quasi-optimum-solution calculation unit 140 decreases the value of the second threshold (th2). This enables the local variation calculation unit 130 to repeat adding a sample point until an appropriate evaluation-value curved-surface may be generated. Upon completion of step S121, the quasi-optimum-solution calculation unit 140 moves the processing to step S111.

In step S122, the quasi-optimum-solution calculation unit 140 outputs, as the quasi-optimum solution, the combination of the number of nodes, the number of processes, and the number of threads that is selected in step S118 lastly. For example, the quasi-optimum-solution calculation unit 140 displays the number of nodes, the number of processes, and the number of threads serving as the quasi-optimum solution on the monitor 21.

A sample point is added in this manner until the global variation becomes equal to or smaller than the first threshold (th1) and the local variation becomes equal to or smaller than the second threshold (th2). The use of the sample points thus set enables an appropriate quasi-optimum solution to be obtained. The reason thereof will be described with reference to FIG. 8.

Figure 8:
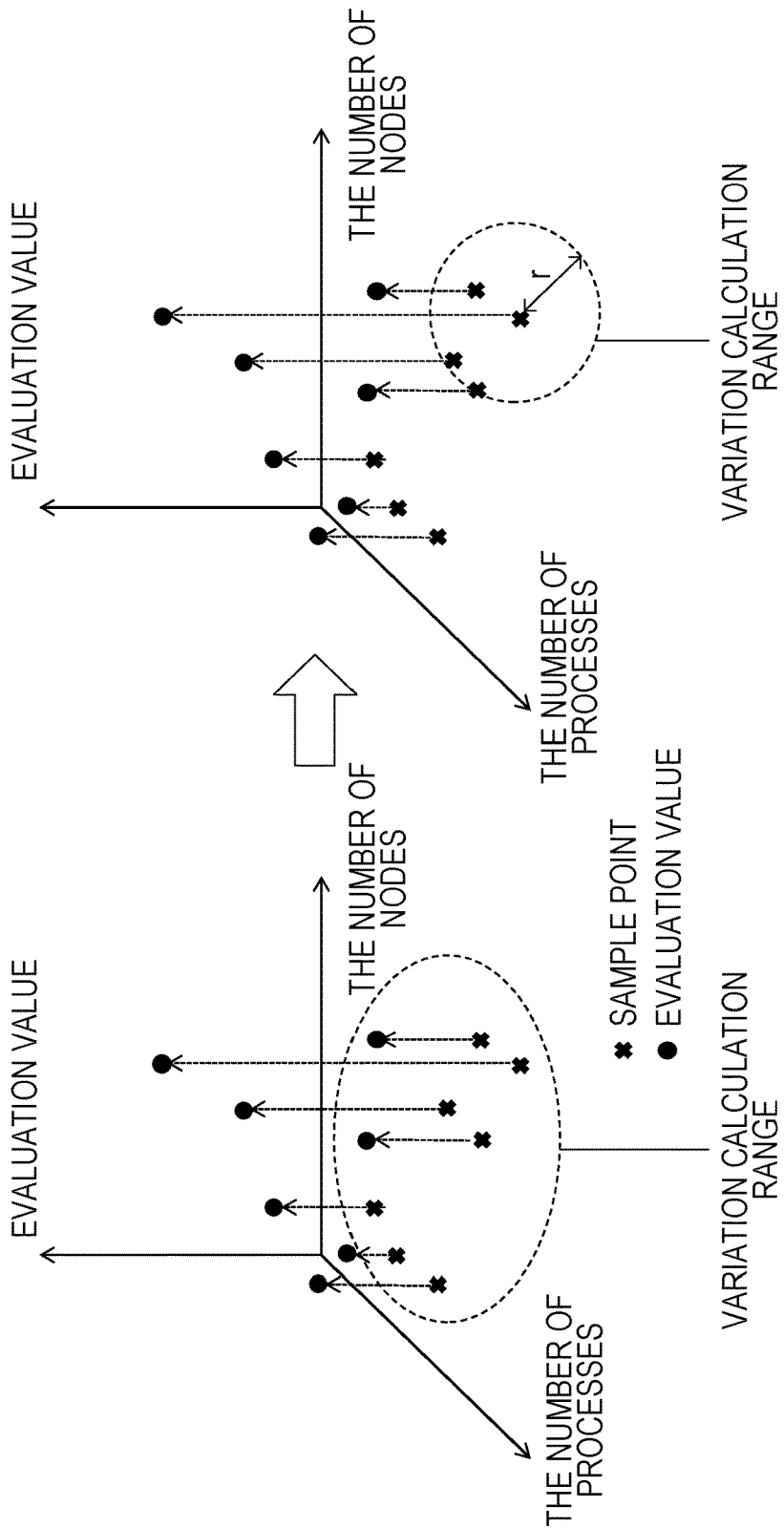
FIG. 8 is a diagram illustrating calculations of a global degree of change (global variation) and local variations.

FIG. 8 is a diagram illustrating the calculations of the global variation and the local variations. For easy-to-understand explanation, an axis representing the number of threads is omitted in FIG. 8.

FIG. 8 illustrates the calculations of the global variation and the local variation on the left part and the right part, respectively. As illustrated in FIG. 8, sample points are arranged on a plane with axes representing the number of processes and the number of nodes, respectively. The evaluation value of each sample point is represented by a height in an axis perpendicular to the plane on which the sample points are arranged. When the global variation is calculated, all of the sample points are used. In contrast, when the local variation is calculated, sample points within the radius r from a calculation target sample point are used.

In the second embodiment, the axis representing the number of threads is added in the space illustrated in FIG. 8, and the evaluation-value curved-surface with the interpolated evaluation values is generated. The evaluation values of combinations of the number of nodes, the number of processes, and the number of threads are thereby estimated, and the quasi-optimum combination of the number of nodes and the number of processes may be obtained. However, if there is considerable variation in the evaluation values not having undergone the interpolation, the accuracy of a solution obtained by the interpolation is assumed to be deteriorated. That is, an insufficient number of samples causes the shape of the evaluation-value curved-surface to be considerably different from the actual shape.

Note that the variation is expressed by using Formula (2). In Formula (2), a difference between the evaluation values of two sample points is divided by a distance between the sample points, and an absolute value of the division result is taken. In other words, the variation may be the absolute value of the average of the variations between the evaluation values of the two respective sample points. A large variation causes the curved surface obtained by interpolating the evaluation values to be an uneven curved surface having steep slopes. A state where the global variation is larger than the first threshold (th1) indicates that there are a large number of sample points to serve as candidates for the largest value or the smallest value. In the state where the sample points to serve as candidates for the largest value or the smallest value account for a high percentage, other candidates for the largest value or the smallest value are also highly likely to be present. Accordingly, obtaining a quasi-optimum solution in this state causes a high possibility of selection of a wrong quasi-optimum solution and deteriorates the accuracy of the quasi-optimum solution.

To avoid such accuracy deterioration, in the second embodiment, the global variation calculation unit 120 first checks the degree of changes in the entire space by using Formula (4). If the value of the global variation is larger than the first threshold (th1) designated by the user, it may be determined that the values in the entire space fluctuate (vary), and thus sample points are added. The app is run also in accordance with the added sample points, evaluation values are obtained, and the global variation is calculated again. Adding the sample points causes the global variation to be updated. If the global variation becomes equal to or smaller than the first threshold (th1) designated by the user, it is determined that the evaluation value variation in a global viewpoint becomes sufficiently small.

Even though the global variation becomes equal to or smaller than the threshold, there is a possibility that a sample point having a large average variation between the sample point and peripheral sample points is still present. The presence of such a sample point leads to a possibility that the evaluation-value curved-surface is not appropriately generated around the sample point and thus causes deterioration of the quasi-optimum solution accuracy. Hence, in the second embodiment, the local variation between each sample point and peripheral sample points is calculated. Adding a sample point around the calculation target sample point is repeated until the local variation of each sample point becomes equal to or smaller than the second threshold (th2).

As described above, when both the global variation and the local variation become equal to or smaller than the respective thresholds, the evaluation values are interpolated by using the interpolation function, and the evaluation-value curved-surface is generated. Searching to cover the entire space is thereby performed in such a manner that a local solution is avoided, and the quasi-optimum combination may be obtained.

Moreover, an amount of processing is significantly reduced compared with the case where the evaluation values are obtained by actually running the app 111 in accordance with all of the combinations of the number of nodes, the number of processes, and the number of threads. Consequently, performance evaluation work may be efficiently performed, and the number of nodes and the number of processes that are quasi-optimum may be selected in a short time.

Other Embodiments

In the second embodiment, the number of nodes, the number of processes, and the number of threads that are optimum are determined; however, the number of parameters to be determined may be 4 or more.

In the second embodiment, the evaluation values are calculated based on the processing time and the arithmetic operation efficiency; however, different information may be used to calculate the evaluation values. For example, power consumption may be considered when the evaluation values are calculated. In this case, a variable representing power consumption is added to the formula for the evaluation values.

In the second embodiment, a smaller evaluation value represents higher evaluation; however, an evaluation expression having a larger evaluation value representing higher evaluation may be used. In this case, a combination of the number of nodes, the number of processes, and the number of threads that has the largest value on the evaluation-value curved-surface is the quasi-optimum solution.

The embodiments have heretofore been illustrated. The configuration of the components in each embodiment may be replaced with that of different components each having the same function. In addition, any other structure or process may be added. Further, two or more configurations (characteristics) of the above-described embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a parallel-processing parameter determination program causing a computer to execute a process comprising:

randomly generating a plurality of first sample points each having a coordinate value representing the number of nodes to be used for running a first program and the number of processes per node to be executed in the running of the first program;

causing computing nodes to run the first program for each of the first sample points in accordance with the number of nodes and the number of processes represented by the first sample point and calculating evaluation values of the respective first sample points based on information collected in the running;

calculating a first statistic by using first sample pairs each obtained by selecting two first sample points from the plurality of first sample points, the first statistic being calculated based on a variation between the evaluation values of the first sample points in each first sample pair, the variation being based on a distance between the first sample points in the first sample pair, the first statistic having a value that is increased as the variation is increased;

repeating the randomly generating of the first sample points, the calculating of the evaluation values, and the calculating of the first statistic until the first statistic becomes equal to or smaller than a first threshold;

generating a second sample point within a predetermined distance from one of the first sample points, the second sample point having a coordinate value representing the number of nodes to be used for running the first program and the number of processes per node to be executed in the running of the first program;

causing the computing nodes to run the first program in accordance with the number of nodes and the number of processes represented by the second sample point and calculating an evaluation value of the second sample point based on information collected in the running;

calculating a second statistic for each of the first sample points that serves as a target first sample point, the second statistic being calculated based on a variation from the evaluation value of the target first sample point to the evaluation value of a different first sample point that is different from the target first sample point and based on a variation from the evaluation value of the target first sample point to the second sample point, the different first sample point and the second sample point being located within the predetermined distance from the target first sample point, each of the variations being based on a distance from the target first sample point to a corresponding one of the different first sample point and the second sample point, the second statistic having a value that is increased as the variation is increased;

repeating the generating of the second sample point, the calculating of the evaluation value of the first sample point, and the calculating of the second statistic until the second statistic of each first sample point becomes equal to or smaller than a second threshold, the generating of the second sample point being performed within the predetermined distance from the one of the first sample points that has the second statistic larger than the second threshold; and determining, based on a result of interpolation of the evaluation values of the first sample points and the second sample point, the number of nodes and the number of processes that are recommended for running the first program.

2. The storage medium according to claim 1,
wherein in the calculating of the first statistic, a difference between the evaluation values of the two first sample points in each first sample pair is divided by the distance between the two first sample points, and an average of absolute values of division results is set as the first statistic.

3. The storage medium according to claim 1,
wherein in the calculating of the second statistic, each of differences from the evaluation value of the target first sample point to a corresponding one of the evaluation value of the different first sample point and the evaluation value of the second sample point is divided by the distance from the target first sample point to the corresponding one of the different first sample point and the second sample point, and an average of absolute values of division results obtained for the different first sample point and the second sample point is set as the second statistic.

4. The storage medium according to claim 1,
wherein in the calculating of the evaluation value of each of the first sample points and the second sample point, the evaluation value is calculated based on a formula using, as variables, at least two of a processing time, an arithmetic operation efficiency, and power consumption that result from the running of the first program by the computing nodes in accordance with the number of nodes and the number of processes represented by a corresponding one of the first sample point and the second sample point.

5. The storage medium according to claim 4,
wherein in the calculating of the evaluation value of each of the first sample points and the second sample point, the at least two of the processing time, the arithmetic operation efficiency, and the power consumption are used as the variables, weightings are applied to the respective variables, and the evaluation value is calculated.

6. The storage medium according to claim 1,
wherein in the determining of the number of nodes and the number of processes that are recommended, a curved surface having the evaluation values of the first sample points and the second sample point is generated by using interpolation processing, and the number of nodes and the number of processes that correspond to a location representing a largest value or a smallest value of the evaluation values on the curved surface are respectively determined as the number of nodes and the number of processes that are recommended for running the first program.

7. The storage medium according to claim 1,
wherein in the generating of the first sample points, the plurality of first sample points each having a coordinate value representing the number of nodes to be used for running the first program, the number of processes per node to be executed in the running of the first program, and the number of threads per process to be executed in the running of the first program are randomly generated, in the calculating of the evaluation values of the first sample points, the computing nodes are caused to run the first program for each first sample point in accordance with the number of nodes, the number of processes, and the number of threads represented by the first sample point, and the evaluation values of the respective first sample points are calculated based on the information collected in the running, in the generating of the second sample point, the second sample point having a coordinate value representing the number of nodes to be used for running the first program, the number of processes per node to be executed in the running of the first program, and the number of threads per process to be executed in the running of the first program is generated within the predetermined distance from the one of the first sample points, in the calculating of the evaluation value of the second sample point, the computing nodes are caused to run the first program in accordance with the number of nodes, the number of processes, and the number of threads represented by the second sample point, and the evaluation value of the second sample point is calculated based on the information collected in the running, and in the determining, the number of nodes, the number of processes, and the number of threads that are recommended for running the first program are determined based on the result of the interpolation of the evaluation values of the first sample points and the second sample point.

8. A parallel-processing parameter determination method performed by a computer, the method comprising steps of:
randomly generating a plurality of first sample points each having a coordinate value representing the number of nodes to be used for running a first program and the number of processes per node to be executed in the running of the first program;

causing computing nodes to run the first program for each of the first sample points in accordance with the number of nodes and the number of processes represented by the first sample point and calculating evaluation values of the respective first sample points based on information collected in the running;

calculating a first statistic by using first sample pairs each obtained by selecting two first sample points from the plurality of first sample points, the first statistic being calculated based on a variation between the evaluation values of the first sample points in each first sample pair, the variation being based on a distance between the first sample points in the first sample pair, the first statistic having a value that is increased as the variation is increased;

repeating the randomly generating of the first sample points, the calculating of the evaluation values, and the calculating of the first statistic until the first statistic becomes equal to or smaller than a first threshold;

generating a second sample point within a predetermined distance from one of the first sample points, the second sample point having a coordinate value representing the number of nodes to be used for running the first program and the number of processes per node to be executed in the running of the first program;

causing the computing nodes to run the first program in accordance with the number of nodes and the number of processes represented by the second sample point and calculating an evaluation value of the second sample point based on information collected in the running;

calculating a second statistic for each of the first sample points that serves as a target first sample point, the second statistic being calculated based on a variation from the evaluation value of the target first sample point to the evaluation value of a different first sample point that is different from the target first sample point and based on a variation from the evaluation value of the target first sample point to the second sample point, the different first sample point and the second sample point being located within the predetermined distance from the target first sample point, each of the variations being based on a distance from the target first sample point to a corresponding one of the different first sample point and the second sample point, the second statistic having a value that is increased as the variation is increased;

repeating the generating of the second sample point, the calculating of the evaluation value of the first sample point, and the calculating of the second statistic until the second statistic of each first sample point becomes equal to or smaller than a second threshold, the generating of the second sample point being performed within the predetermined distance from the one of the first sample points that has the second statistic larger than the second threshold; and determining, based on a result of interpolation of the evaluation values of the first sample points and the second sample point, the number of nodes and the number of processes that are recommended for running the first program.

9. A parallel-processing parameter determination apparatus comprising;

a memory, and a processor coupled to the memory and configured to perform a process comprising:

randomly generating a plurality of first sample points each having a coordinate value representing the number of nodes to be used for running a first program and the number of processes per node to be executed in the running of the first program;

causing computing nodes to run the first program for each of the first sample points in accordance with the number of nodes and the number of processes represented by the first sample point and calculating evaluation values of the respective first sample points based on information collected in the running;

calculating a first statistic by using first sample pairs each obtained by selecting two first sample points from the plurality of first sample points, the first statistic being calculated based on a variation between the evaluation values of the first sample points in each first sample pair, the variation being based on a distance between the first sample points in the first sample pair, the first statistic having a value that is increased as the variation is increased;

repeating the randomly generating of the first sample points, the calculating of the evaluation values, and the calculating of the first statistic until the first statistic becomes equal to or smaller than a first threshold;

generating a second sample point within a predetermined distance from one of the first sample points, the second sample point having a coordinate value representing the number of nodes to be used for running the first program and the number of processes per node to be executed in the running of the first program;

causing the computing nodes to run the first program in accordance with the number of nodes and the number of processes represented by the second sample point and calculating an evaluation value of the second sample point based on information collected in the running;

calculating a second statistic for each of the first sample points that serves as a target first sample point, the second statistic being calculated based on a variation from the evaluation value of the target first sample point to the evaluation value of a different first sample point that is different from the target first sample point and based on a variation from the evaluation value of the target first sample point to the second sample point, the different first sample point and the second sample point being located within the predetermined distance from the target first sample point, each of the variations being based on a distance from the target first sample point to a corresponding one of the different first sample point and the second sample point, the second statistic having a value that is increased as the variation is increased;

repeating the generating of the second sample point, the calculating of the evaluation value of the first sample point, and the calculating of the second statistic until the second statistic of each first sample point becomes equal to or smaller than a second threshold, the generating of the second sample point being performed within the predetermined distance from the one of the first sample points that has the second statistic larger than the second threshold; and determining, based on a result of interpolation of the evaluation values of the first sample points and the second sample point, the number of nodes and the number of processes that are recommended for running the first program.

\* \* \* \* \*